United States Patent
Anderson

[15] 3,703,071
[45] Nov. 21, 1972

[54] ROTARY BLADE FOR MULCHING LAWN MOWER

[72] Inventor: Charles I. Anderson, 7399 Main Street, Downers Grove, Ill. 60515

[22] Filed: Feb. 17, 1972

[21] Appl. No.: 227,194

[52] U.S. Cl. .................................. 56/295, 56/503
[51] Int. Cl. ............................................ A01d 55/18
[58] Field of Search ........ 56/295, 255, 503, 16.4, 13.8

[56] References Cited

UNITED STATES PATENTS

| | | | |
|---|---|---|---|
| 2,547,540 | 4/1951 | Roberts | 56/255 |
| 2,697,322 | 12/1954 | Watrous | 56/295 |
| 3,242,660 | 3/1966 | Gary | 56/13.8 |
| 3,482,380 | 12/1969 | Stair | 56/295 |
| 3,538,692 | 11/1970 | Cope et al. | 56/295 |

*Primary Examiner*—Russell R. Kinsey
*Attorney*—James A. Davis et al.

[57] ABSTRACT

Rotary blade for a power-driven lawn mower comprising an elongate body terminating at each end in a plurality of integral cutting fingers parallel to and displaced successively below and above the plane of the body with each finger defining a different plane and the upper surfaces of the leading edges of the fingers and the lower surfaces of their trailing edges chamfered to form cutting edges, whereby top-to-bottom reversal of the blade presents as leading cutting edges those that were trailing edges.

4 Claims, 4 Drawing Figures

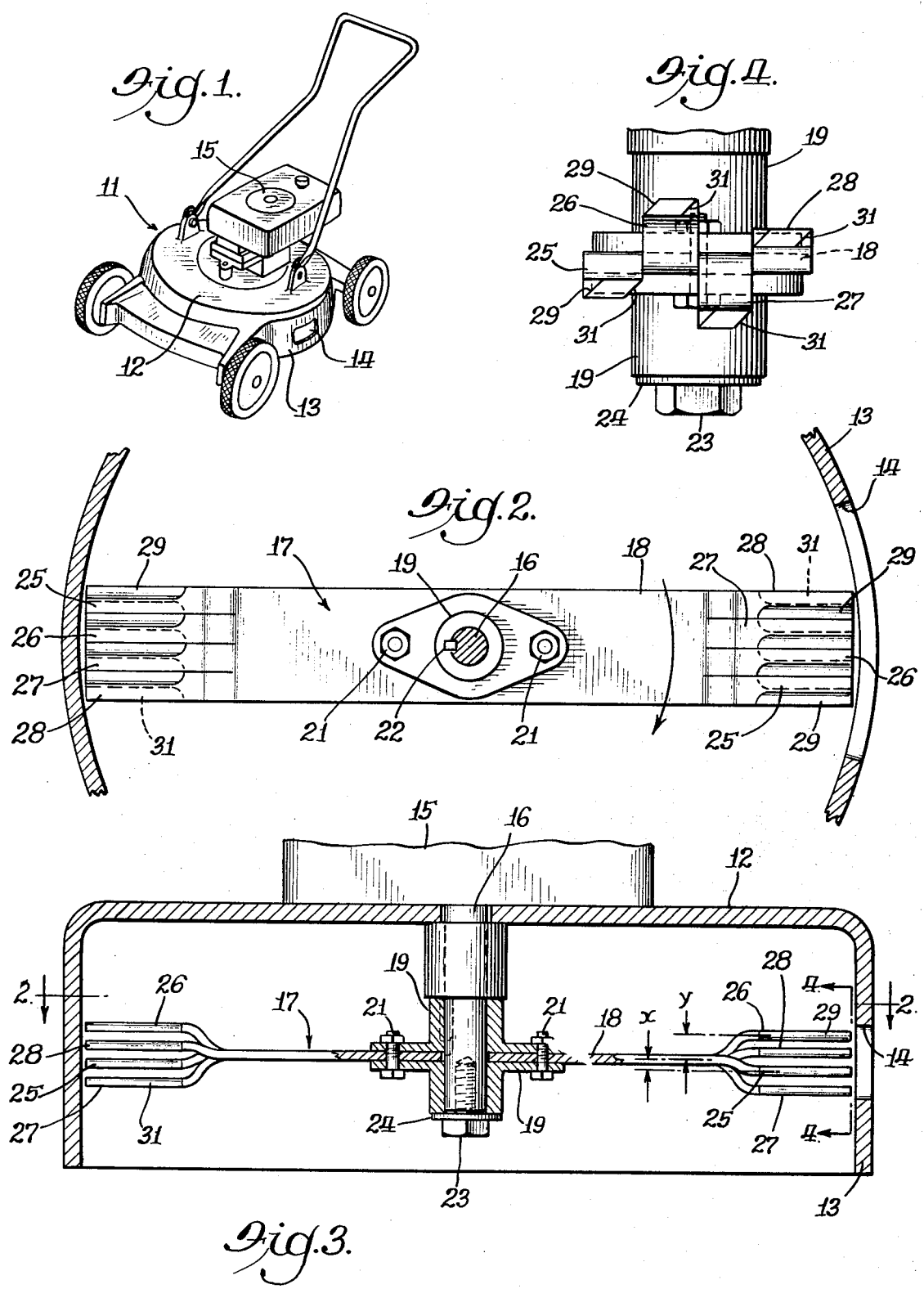

ROTARY BLADE FOR MULCHING LAWN MOWER

BACKGROUND OF THE INVENTION

1. Field of the Invention:

This invention relates in general to lawn mowers and more particularly to a rotary blade for power-driven lawn mowers.

2. Description of the Prior Art:

The standard rotary blade for power-driven lawn mowers comprises an elongate body having centrally disposed means attachable to the depending end of a vertical drive shaft and a chamfered portion adjacent the outer end of each leading edge for horizontal cutting. This effects a single cutting of the grass substantially in the horizontal plane or rotation of the blade. It has been suggested to employ various other blade configurations, but the simple single blade which has become standard seems to get the best results as compared to such other prior art blades, and so far as is known, fine comminuting of the grass and small twigs and leaves to provide discharged material suitable for spreading on the cut lawn for mulching purposes has not been considered to be attainable with only a single elongate blade in a power-driven lawn mower. A plurality of blades have been suggested, but not for fine cutting for mulching purposes. As an example, U.S. Letters Pat. No. 3,162,990 employs an auxiliary guard attached to and disposed above the usual elongate blade that, although it includes an auxiliary horizontal cutting edge above and ahead of the regular blade, is provided solely as a safety precaution to prevent contact of the latter with solid large size objects, which is accomplished by a plurality of radially spaced vertical guard fingers depending from the auxiliary guard and extending below the blade proper.

SUMMARY OF THE INVENTION

A principal object of this invention is to aid in the ecology by means of a simple, inexpensive and long-lived rotary blade for power-driven lawn mowers which very finely comminutes the grass and small twigs and leaves fallen on a lawn and spreads the finely cut material over the lawn for natural mulching purposes, thereby enhancing the growth and condition of the lawn and, at the same time, completely eliminating the usual raking, collection and disposal of grass cuttings and leaves, including the burning of leaves which now is or is being legislated against.

The blade of this invention comprises an elongate body having a centrally disposed socket for engagement with the lower end of the vertical drive shaft of any standard power-driven mower in substitution for its regular blade and adapted to be reversed top-to-bottom thereon, with a plurality of cutting fingers at each end parallel to and displaced successively below and above the plane of the body with each finger defining a different plane and the upper surface of the leading edge and the lower surface of the trailing edge of each finger being chamfered to form a cutting edge, and preferably with the total width of the fingers at each end being substantially equal to the width of the body. In the drawings:

FIG. 1 is a perspective view of a lawn mower embodying the features of the invention;

FIG. 2 is a sectional view taken substantially on the line 2—2 of FIG. 3;

FIG. 3 is an enlarged vertical sectional view through the axis of the drive shaft; and FIG. 4 is a detailed end elevation of the blade, as seen from the line 4—4 of FIG. 3, and on an enlarged scale.

DESCRIPTION OF THE PREFERRED EMBODIMENT

Referring particularly to FIG. 1, reference numeral 11 indicates in general a lawn mower embodying the features of this invention which includes the usual inverted wheel-mounted housing 12 open at the bottom and having a substantially vertical skirt or flange 13 with an opening or discharge aperture 14 at one side. This housing 12 supports the usual motor means 15 which includes a vertical drive shaft 16 depending through the housing 12 into the inverted chamber defined thereby, as shown best in FIG. 3. This general arrangement is that common to all currently commercial rotary power-driven lawn mowers, and it is intended that the usual vertical adjusting means for varying the height of the housing be included between the wheel means and the housing supported thereby.

This invention is directed to a rotary blade, indicated generally by reference numeral 17 (FIGS. 2 and 3), which is adapted to be mounted upon the depending end of the vertical drive shaft 16 in substitution for the standard cutting blade. This blade 17 comprises an elongate main body 18 having a centrally disposed socket drivingly engageable with the shaft 15 which, in the embodiment herein illustrated, is made up of a pair of identical hub members 19 connected to each other and the main body 18 by nut and bolt means 21 and having a keyway for receiving the usual drive key 22 (FIG. 2) to insure positive driving connection with the shaft 16 that has the usual complemental keyway. As shown in FIG. 3, a retaining bolt 23 is screwed into a suitable tapped receiving aperture in the drive shaft 16 and cooperates with a lock washer 24 for removably retaining the rotary blade 17 on the drive shaft 16. Thus, merely by removing the retaining bolt 23, the rotary blade 17 may be slid off of the drive shaft 16, reversed top-to-bottom, and replaced on the drive shaft in inverted position where it will be positively retained merely by reinserting the retaining bolt 23 with its lock washer 24.

At each of its ends, the main body 18 of the blade 17 terminates in a plurality of cutting fingers 25, 26, 27 and 28 which are parallel to each other and the main body 18 and displaced successively below and above the plane of that main body, with each finger defining a different plane. More specifically, with the direction of rotation of the blade 17 being clockwise as indicated by the arrow shown in FIG. 2, the finger 25 is the leading finger and as shown in FIGS. 3 and 4, is displaced below the main body 18. As best seen in FIG. 3, the center line distance between this leading finger 25 and the plane of the main body 18 is designated by the dimension $x$, it being observed that the major portion of the finger is substantially horizontally disposed and is joined to the main body 18 by an inner curved portion.

The next finger 26 adjacent the leading finger 25 is displaced above the plane of the main body 18 a distance designated in FIG. 3 by the dimension $y$. As will be observed from that Figure, such distance $y$ between the center lines of the main body portion 18 and the second cutting finger 26 is twice the distance $x$. The third cutting finger 27 next adjacent and trailing the second finger 26 is displaced below the plane of the main body 18 the same distance $y$ as is the second finger 26 disposed above the main body. The fourth or last trailing finger 28 is displaced above the main body 18 the same distance $x$ as is the first finger 25 below the main body. It will be appreciated, of course, that while these several cutting fingers 25–28 are disclosed herein as being integral extensions of the main body 18, it is contemplated that the same may be formed separately and attached to the main body in any suitable manner. As best seen in FIG. 2, the total of the widths of these fingers 25–28 at each end of the main body 18 substantially equals the width of the main body.

The upper surface of the leading edge of each of these fingers 25–28 is chamfered at 29 to form a cutting edge, and the lower surface of the trailing edge of each of these fingers similarly is chamfered at 31. Thus, when the blade is mounted as illustrated herein, rotation thereof in the usual manner results in the chamfered upper portions 29 functioning as leading cutting edges, and when the blade is reversed top-to-bottom on the drive shaft 16, the chamfered portions 31 will then be disposed as leading cutting edges. And, with the vertical offsetting of the cutting fingers 25–28 as hereinbefore described, the leading finger, whether 25 with the blade mounted as herein illustrated or 28 following a top-to-bottom reversal, will have its cutting edge 29 or 31 disposed the smaller distance $x$ from the main body 18, and the third cutting finger 27, or the second cutting finger 26 if the blade has been reversed top-to-bottom, will have their cutting edges 29 or 31, respectively, disposed below the main body 18 the greater distance $y$. Thus, the two lower cutting fingers at each end of the main body 18 will successively sever upstanding blades of grass incrementally, with the leading such blade first chopping off the upper ends of the grass blades followed by a cutting therefrom by the trailing lower finger of grass blade sections having lengths $x$. The cut end portions of the grass blades so severed will be deflected by these lower cutting fingers upwardly into the paths of the upper cutting fingers 26,28 or 27,25, as the case may be, for further comminuting action. The same style of comminuting of leaves and small twigs that have fallen onto the surfaces of the lawn will similarly be effected, and the cutting fingers 25-28 at each end of the main body 18 will function in the same manner. With this arrangement, communinuting of the grass and small twigs and leaves is sufficiently fine before being discharged by virtue of the rotary action of the blade 17 through the aperture 14 that the discharged material is suitable and extremely advantageous for mulching purposes. Therefore, it is unnecessary to collect the material discharged from the mower, and the usual raking, collection and disposal of grass cuttings and leaves from the lawn, including the burning of the leaves, is completely eliminated. Whenever the leading cutting edges 29 are dulled from use, it is a simple matter to remove and replace the blade 17 in top-to-bottom reversed position which then will present the previous trailing chamfered surfaces 31 as the leading cutting edges on the fingers 25–28.

It is thought that this invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A rotary blade for a power-driven lawn mower having a vertically depending drive shaft, comprising an elongate main body having a centrally disposed socket drivingly engaging said shaft, said body terminating at each end in a plurality of cutting fingers parallel to and displaced successively below and above the plane of said body with each finger defining a different plane, the upper surface of the leading edge and the lower surface of the trailing edge of each of said fingers being chamfered to form a cutting edge, whereby top-to-bottom reversal of said blade presents as leading cutting edges those that were trailing edges.

2. A rotary blade according to claim 1, wherein the total of the widths of said fingers at each end of said body substantially equals the width of said body.

3. A rotary blade according to claim 1, wherein said fingers are integral extensions of said body.

4. In a mulching lawn mower, comprising an inverted housing open at the bottom and having a substantially vertical skirt supported by wheel means a predetermined distance from the ground to define a chamber with an opening at one side defining a mulch discharge aperture, motor means mounted on said housing, and a vertical drive shaft rotated by said motor means and depending through said housing into said chamber; and elongate blade having a centrally disposed socket drivingly engaging the lower end of said shaft to position said blade in approximately horizontal alignment with the vertical center of said discharge aperture, said blade terminating at each end in a plurality of horizontal fingers each defining a different plane disposed successively below and above said vertical center of said discharge aperture, and the upper surface of the leading edge and the lower surface of the trailing edge of each of said fingers being chamfered to form a cutting edge, whereby top-to-bottom reversal of said blade presents as leading cutting edges those that were trailing edges and rotation of said blade as the mower is moved on said wheel means results in mulching within said chamber of grass, leaves and small twigs encountered by said blade and discharging thereof through said aperture to spread the same over adjacent ground areas.

* * * * *